United States Patent Office 2,722,997
Patented Nov. 8, 1955

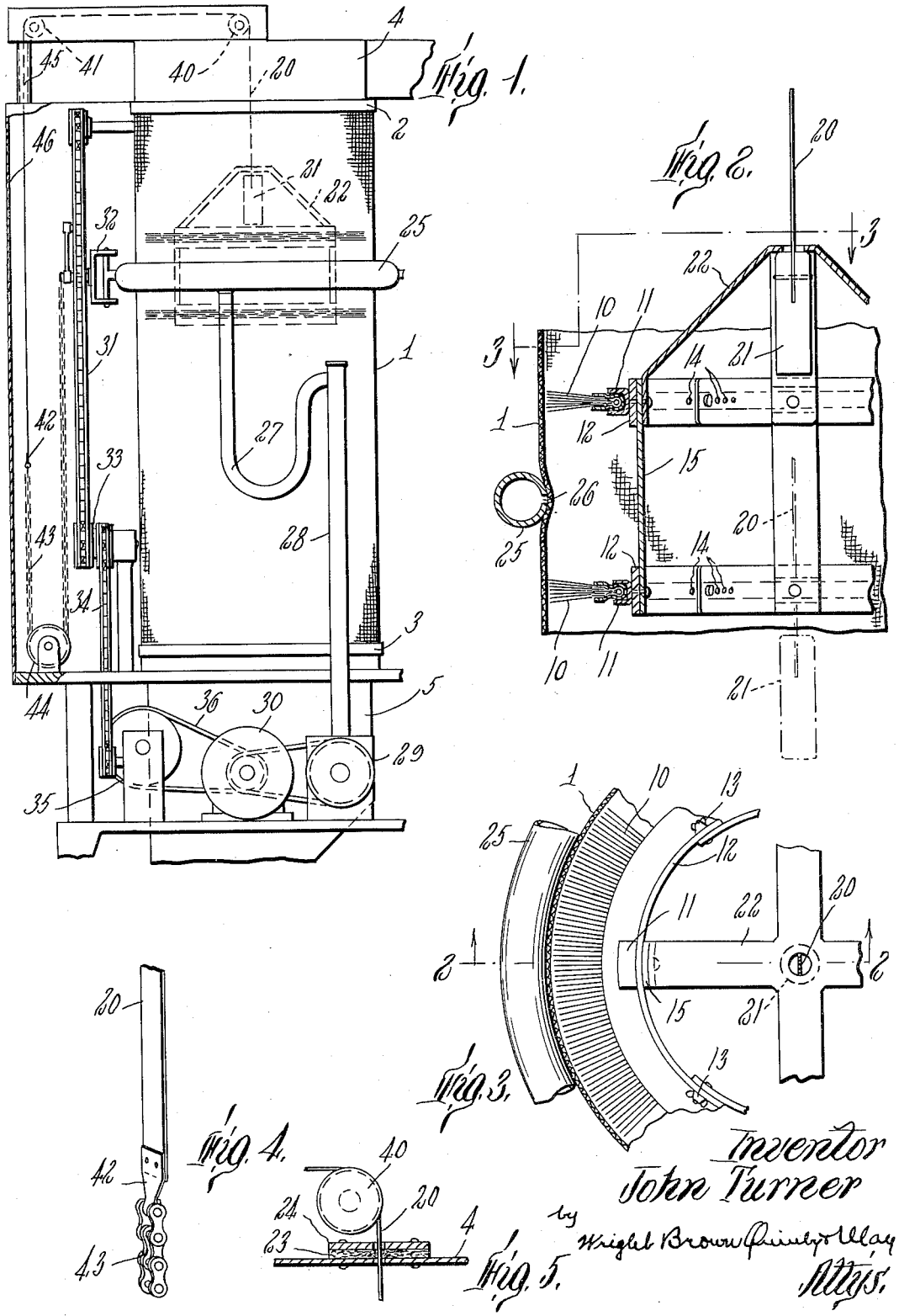

2,722,997

DUST COLLECTOR

John Turner, Newton, Mass.

Application April 20, 1953, Serial No. 349,616

3 Claims. (Cl. 183—60)

This invention relates to dust collectors, and more particularly to collectors of the type which employ one or more upright fabric filter tubes within which the dust-containing air is introduced, the air passing through the tube walls while the dust is removed from their lower ends. Commonly such a tube is provided with a reciprocable exterior blow ring having a slot facing the tube and through which air under pressure is passed to pass through the material of the tube and dislodge dust from its inner face. Under certain conditions and with certain types of dust this blow ring is not entirely satisfactory for the purpose.

In accordance with this invention, therefore, a brush mechanism is employed within the tube either in connection with an external blow ring, or under some conditions without using such a blow ring. When used with a blow ring, the air pressure within the blow ring may often be much reduced and give satisfactory results.

For a complete understanding of this invention, reference may be had to the accompanying drawings in which Figure 1 is a side elevation showing a filter having a single filtering tube and embodying the invention.

Figure 2 is a detail sectional view on line 2—2 of Figure 3.

Figure 3 is a detail sectional view on line 3—3 of Figure 2.

Figure 4 is a fragmentary detail perspective view of a portion of the actuating mechanism.

Figure 5 is a fragmentary section through a portion of the inlet conduit wall.

Referring to the drawings, there is shown in Figure 1 an upright filter tube 1 supported at its upper and lower ends as at the rings 2 and 3, respectively. Air containing the dust to be removed is introduced into the upper end of the tube 1 through a conduit 4, the air passing through the material of the tube and the dust dropping down through the tube and into a receptacle 5 beneath it. In many cases a plurality of such filter tubes are employed in a single filter, and this apparatus may be provided with multiple filters, if desired.

Within the filter tube is arranged an annular brush mechanism and herein shown two annular brushes are employed, each having bristles 10 facing outwardly and preferably terminating slightly inwardly of the inner face of the filter. As shown these bristles are retained in an annular clip or holder 11 carried by a ring 12 which is adjustable in size as by the use of overlapping portions secured together by bolts and wing nuts at 13 passed through any selected or series of perforations 14 through the overlapping portions. Preferably these bristles comprise fibers, a major portion of which may be formed of non-conductive material such as nylon, but they should also include a portion of conducting fibers such as bronze, which act to dissipate any static charges which might otherwise be developed on the inner face of the filter during the filtering operation. The two brushes are shown spaced apart lengthwise of the filter tube and they are connected by spacers 15.

The conducting fibers are grounded through the rings 12, spacers 15, and the mechanism by which the brushes are reciprocated lengthwise of the filter tube. Such mechanism as shown comprises for each filter tube a metal ribbon 20 which is connected at its lower end to a weight 21, upon which rests by gravity and free from attachment to said weight and ribbon, a conductive spider 22 in electrical connection with the rings 12 and the conducting fibers of the brushes. The weight 21 holds the ribbon 20 taut even though the brush mechanism should become hung up in the tube through faulty size adjustment or other reason.

Where an external blow ring is employed, this blow ring, shown at 25 and provided with a slot 26 facing the filter tube 1, is supported against the outer face of the filter tube between the two brushes as shown best in Figure 2 and the brushes and blow ring are moved along the tube in unison. The blow ring is supplied with air under pressure through a flexible hose connection 27 (see Figure 1) from a pipe 28 fed from a blower 29 driven by a motor 30. This motor 30 may actuate a raising and lowering mechanism for the blow ring comprising an endless chain 31 having a crank connection at 32 with the blow ring and which is driven from a shaft 33 through a chain 34 connected to a reduction gear drive at 35 which is driven from the motor 30 as through a belt connection 36. This reciprocating mechanism for the blow ring is old and well known. It is also connected to operate the ribbon 20 to raise and lower the brushes with the blow ring. As shown the ribbon 20 passes over a pair of pulleys 40 and 41 and then downwardly where it is connected as by the connector 42 shown best in Figure 4 to a chain 43 which passes around a pulley 44, the opposite end of the chain being connected to the member 32. The ribbon 20 passes through the conduit 4 and through its top wall, as shown in Figure 5, through a slot through a felt pad 23 held in place by a clamp plate 24. Beyond the pulley 41 it passes through a tube 45 and into the clean air casing 46 within which the filter tube 1 is housed. Thus as the blow ring is moved up and down, the ribbon 20 is alternately pulled and then relaxed to raise and lower the weight 21 and with it the brushes 10. Should for any reason the brushes become stuck at any point in their travel, the weight 21 may descend without positively moving the brushes but on again being lifted, as soon as it reaches the spider 22, it will carry the brushes upward with it.

As before noted, in some cases it is possible to do without the blow ring entirely and where the blow ring is employed, it is usually possible to reduce the air pressure within substantially, and yet provide proper operation. The bristles of the brushes preferably terminate just short of contact with the inner face of the filter tube, thus to leave thereon a thin deposit of dust or fibrous material which acts as an additional filtering medium to the tube itself, but this is not allowed to build up to such an extent as to interfere with proper filtering, by reason of its removal by the brushes, except for the thin layer desired.

The use of a flat ribbon 20 is important because it prevents the accretion of fibers contained in the dust-ladened air thereon which if permitted might build up and finally clog the filter. The flat ribbon does not permit such accretions and hence is highly desirable for the purpose.

From the foregoing description of an embodiment of this invention it will be understood by those skilled in the art that various changes and modifications may be made without departing from its spirit or scope.

I claim:

1. In combination, an upright filter tube, an annular brush within said tube having bristles facing the inner face of said tube, a weight within said tube on which said brush rests, a flexible element connected to said weight and extending upwardly within said tube, said brush resting by gravity on said weight and free from attachment to said weight and element, and means for alternately pulling and relaxing said element to thereby raise and lower said weight with corresponding motion of said brush save when said brush may have become stuck and fail to descend with said weight.

2. In combination, an upright filter tube, an annular brush within said tube having bristles facing the inner face of said tube, a weight within said tube on which said brush rests, a flexible element connected to said weight and extending upwardly within said tube, said brush resting by gravity on said weight and free from attachment to said weight and element, and means for alternately pulling and relaxing said element to thereby raise and lower said weight with corresponding motion of said brush save when said brush may have become stuck and fail to descend with said weight, said element being formed as a flat ribbon.

3. In combination, an upright filter tube, a pair of annular brushes spaced apart axially of and within said tube, each brush having bristles facing the inner face of said tube, a blow ring mounted for motion axially of and external to said tube between said brushes and having a discharge opening facing said tube, means operatively connected thereto for moving said brush and blow ring together alternately in opposite directions, and means supplying air under pressure to the interior of said blow ring to pass through said discharge opening and tube.

References Cited in the file of this patent

UNITED STATES PATENTS

| 356,243 | Elkins | Jan. 18, 1887 |
| 584,711 | Sheets | June 15, 1897 |
| 2,575,876 | Kausch | Nov. 20, 1951 |

FOREIGN PATENTS

| 8,681 | Great Britain | Apr. 11, 1910 |
| 41,422 | Austria | Mar. 25, 1910 |